(12) United States Patent
Castano

(10) Patent No.: US 9,768,882 B2
(45) Date of Patent: *Sep. 19, 2017

(54) EXTERNAL LIGHT GUIDE FOR ELECTRONIC DEVICES

(71) Applicant: ProTVSolutions LLC, Temecula, CA (US)

(72) Inventor: Guillermo Castano, San Ysidro, CA (US)

(73) Assignee: ProTVSolutions LLC, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,910

(22) Filed: Jul. 18, 2016

(65) Prior Publication Data

US 2016/0329969 A1   Nov. 10, 2016

Related U.S. Application Data

(63) Continuation of application No. 14/310,551, filed on Jun. 20, 2014, now Pat. No. 9,432,125.

(60) Provisional application No. 61/837,466, filed on Jun. 20, 2013.

(51) Int. Cl.
  *H04B 10/06* (2006.01)
  *H04B 10/60* (2013.01)
  *G08C 23/04* (2006.01)

(52) U.S. Cl.
  CPC ............ *H04B 10/60* (2013.01); *G08C 23/04* (2013.01)

(58) Field of Classification Search
  CPC ........ H04B 10/60; H04B 10/61; H04B 10/63; H04B 10/64; H04B 10/66; H04B 10/67; G08C 23/04
  USPC .......................... 398/202, 212, 203, 204, 207
  See application file for complete search history.

(56) References Cited

U.S. PATENT DOCUMENTS

| | | |
|---|---|---|
| 5,073,979 A | 12/1991 | Webb |
| 5,227,632 A | 7/1993 | Armstrong et al. |
| 5,452,135 A * | 9/1995 | Maki .................. G01J 1/04 250/342 |
| 7,808,274 B2 | 10/2010 | Dover et al. |
| 8,295,707 B2 | 10/2012 | Wu |
| 9,432,125 B2 * | 8/2016 | Castano ................ H04B 10/60 |
| 2005/0196134 A1 | 9/2005 | Lee |
| 2006/0124851 A1 | 6/2006 | Kajikuri |
| 2014/0376928 A1 | 12/2014 | Castano |

\* cited by examiner

*Primary Examiner* — M. R. Sedighian
(74) *Attorney, Agent, or Firm* — Pauly, DeVries, Smith & Deffner LLC

(57) ABSTRACT

The present invention is directed, in part, to a receiver for an infrared light source. The receiver comprises a substantially transparent body; a sensor for receiving infrared light; and a substantially planar first surface on the transparent body. The first surface is configured to direct light from the infrared light source to the sensor. The substantially planar first surface comprises the end of the substantially transparent body. The substantially planar first surface provides an internally reflective surface that directs light into the interior of the substantially transparent body so it will make contact with the sensor.

18 Claims, 12 Drawing Sheets

US 9,768,882 B2

EXTERNAL LIGHT GUIDE FOR ELECTRONIC DEVICES

CLAIM OF PRIORITY

This application is a Continuation of U.S. application Ser. No. 14/310,551, filed Jun. 20, 2014, which claims the benefit of U.S. Provisional Application No. 61/837,466, filed Jun. 20, 2013, the contents of which are herein incorporated by reference in their entirety.

FIELD OF THE INVENTION

The present invention is directed to guides. More specifically, the invention is directed to light guides for use in transmitting infrared (IR) light signals from a remote to an electronic device.

BACKGROUND

Setup boxes, such as cable and satellite tuners, may be installed hidden from the user and thus require an external IR receiver to get the remote control signals for operation. Current standard IR receivers are placed on the front of the TV and are easy to bump off during cleaning. In hotels, these sensors may be confused with hidden cameras and become a privacy issue. Therefore, a need exists for a low profile reflective IR receiver that improves on the standard by implementing a near invisible process.

SUMMARY OF THE INVENTION

The present invention is directed, in part, to a receiver for an infrared light source. The receiver comprises a substantially transparent body; a sensor for receiving infrared light; and a substantially planar front surface on the transparent body. The front surface is configured to direct light from the infrared light source to the sensor. The substantially planar front surface comprises the end of the substantially transparent body. The substantially planar front surface provides an internally reflective surface that directs light into the interior of the substantially transparent body so it will make contact with an infrared sensor.

In some implementations the substantially planar surface of the transparent body comprises substantially all of an end of the transparent body. Typically the substantially planar surface of the transparent body is located opposite the sensor. The transparent body may be formed of a polymeric material. Generally the transparent body is at least two times as long as it is wide, optionally at least three times as long as it is wide.

In most implementations the substantially planar surface of the transparent body has an angle of from 30 to 60 degrees relative to an adjacent wall of the substantially transparent body. In the alternative, the substantially planar surface of the transparent body has an angle of from 35 to 55 degrees relative to an adjacent wall of the substantially transparent body. Optionally the substantially planar surface of the transparent body has an angle of from 40 to 50 degrees relative to an adjacent wall of the substantially transparent body. Typically the substantially planar surface of the transparent body has an angle of from 43 to 47 degrees relative to an adjacent wall of the substantially transparent body, most typically the substantially planar surface of the transparent body has an angle 45 degrees relative to an adjacent wall of the substantially transparent body.

The above summary of the present invention is not intended to describe each discussed embodiment of the present invention. This is the purpose of the figures and the detailed description that follows.

FIGURES

The invention may be more completely understood in connection with the following drawings, in which.

Figure 1:
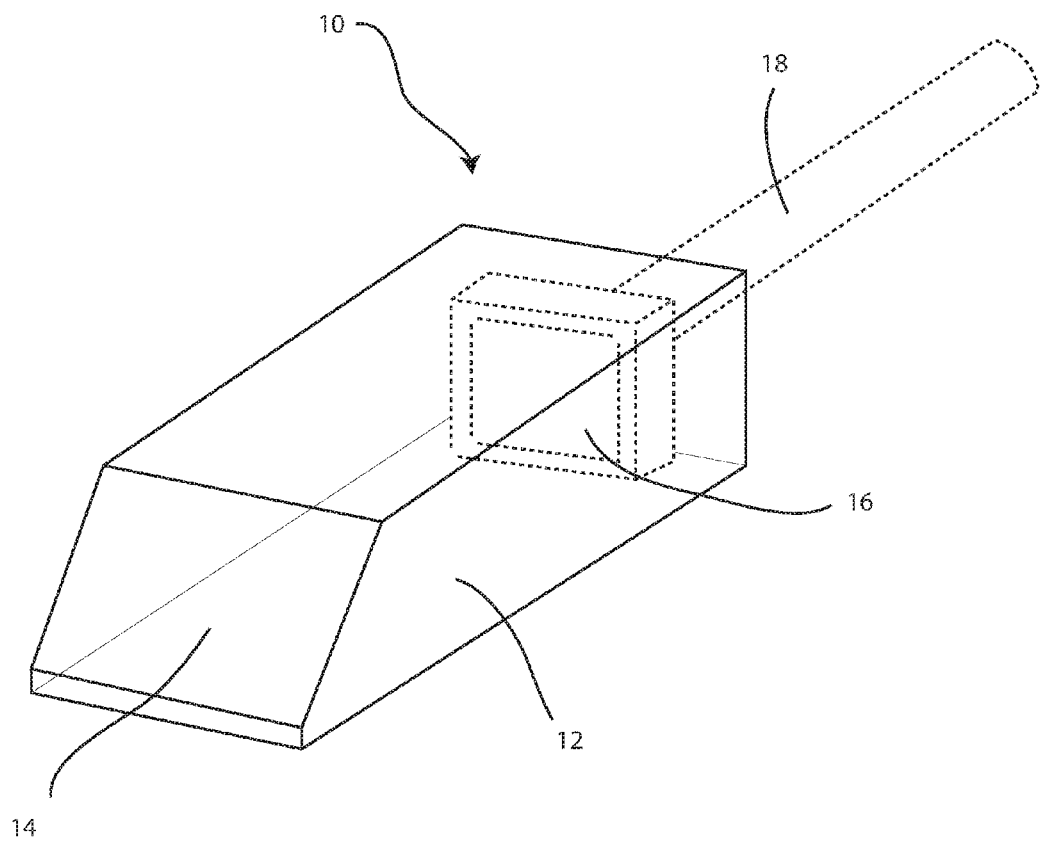
FIG. 1 is a perspective view of an IR receiver made in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed, in part, to a receiver for an infrared light source. The receiver comprises a substantially transparent body; a sensor for receiving infrared light; and a substantially planar first surface on the transparent body. The first surface is configured to direct light from the infrared light source to the sensor. The substantially planar first surface comprises the end of the substantially transparent body. The substantially planar first surface provides an internally reflective surface that directs light into the interior of the substantially transparent body so it will make contact with the sensor.

In some implementations the substantially planar surface of the transparent body comprises substantially all of an end of the transparent body. Typically the substantially planar surface of the transparent body is located opposite the sensor. The transparent body may be formed of a polymeric material. Generally the transparent body is at least two times as long as it is wide, optionally at least three times as long, as it is wide.

In most implementations the substantially planar surface of the transparent body has an angle of 30 to 60 degrees relative to an adjacent wall of the substantially transparent body.

In the alternative, the substantially planar surface of the transparent body has an angle of 35 to 55 degrees relative to an adjacent wall of the substantially transparent body. Optionally the substantially planar surface of the transparent body has an angle of 40 to 50 degrees relative to an adjacent wall of the substantially transparent body. Typically the substantially planar surface of the transparent body has an angle of 43 to 47 degrees relative to an adjacent wall of the substantially transparent body. Most typically the substantially planar surface of the transparent body has an angle 45 degrees relative to an adjacent wall of the substantially transparent body.

In certain embodiments the substantially planar first surface has a surface area at least 50 percent the cross sectional surface area of the substantially transparent body, the cross section take in a plane perpendicular to a line intersecting the substantially planar first surface of the transparent body and the sensor. Optionally, the substantially planar first surface has a surface area at least 100 percent the cross sectional surface area of the substantially transparent body, the cross section take in a plane perpendicular to a line intersecting the substantially planar first surface of the transparent body and the sensor. In some implementations the substantially planar first surface has a surface area at least 150 percent the cross sectional surface area of the substantially transparent body, the cross section take in a plane perpendicular to a line intersecting the substantially planar first surface of the transparent body and the sensor.

Now, in reference to the drawings, FIG. 1 is a perspective view of an IR receiver 10 made in accordance with an implementation of the invention. The IR receiver 10 includes a substantially transparent body 12, having a substantially planar end surface 14. Inside the transparent body 12 (or at the end opposite to the end surface 14), is positioned a sensor 16, connected by electronic cable or wire 18 to an electronic device (not shown—such as a cable set back box or set top box, a satellite set back box or set top box, or another electronic apparatus that has an IR input). The transparent body 12 may be formed of a polymeric material.

Figure 2:
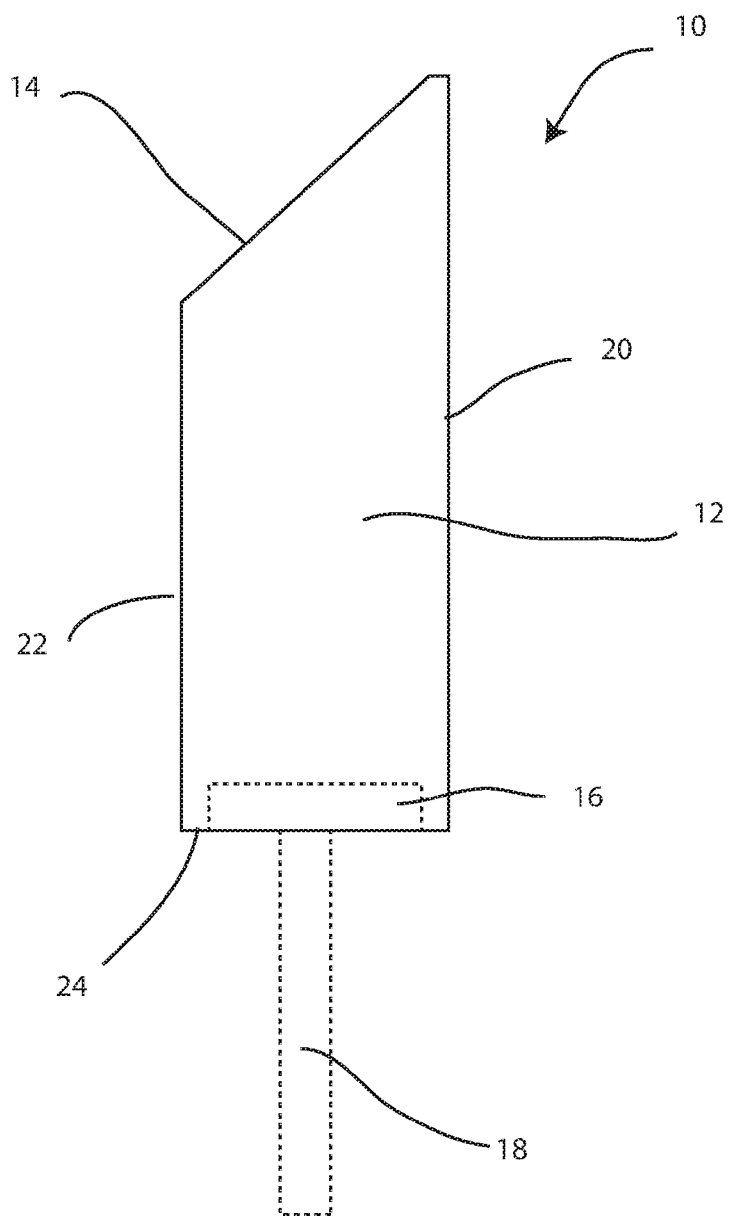
FIG. 2 is a side perspective view of an IR receiver made in accordance with an implementation of the invention.

Referring now to FIG. 2 a side perspective view of an IR receiver 10 made in accordance with the implementation of FIG. 1 is shown. The receiver 10 shows a substantially transparent body 12, having a substantially planar end surface 14. The planar end surface 14 is located next to side surfaces 20, 22, and opposite end 24. Inside the transparent body 12 (or at the end of the body 12), is positioned a sensor 16, connected by electronic cable or wire 18.

In most implementations the substantially planar surface of the transparent body has an angle of 30 to 60 degrees relative to an adjacent wall of the substantially transparent body. In the alternative, the substantially planar surface of the transparent body has an angle of 35 to 55 degrees relative to an adjacent wall of the substantially transparent body. Optionally substantially planar surface of the transparent body has an angle of 40 to 50 degrees relative to an adjacent wall of the substantially transparent body. Typically the substantially planar surface of the transparent body has an angle of from 43 to 47 degrees relative to an adjacent wall of the substantially transparent body. Desirably the substantially planar surface of the transparent body has an angle 45 degrees relative to an adjacent wall of the substantially transparent body.

Figure 3:
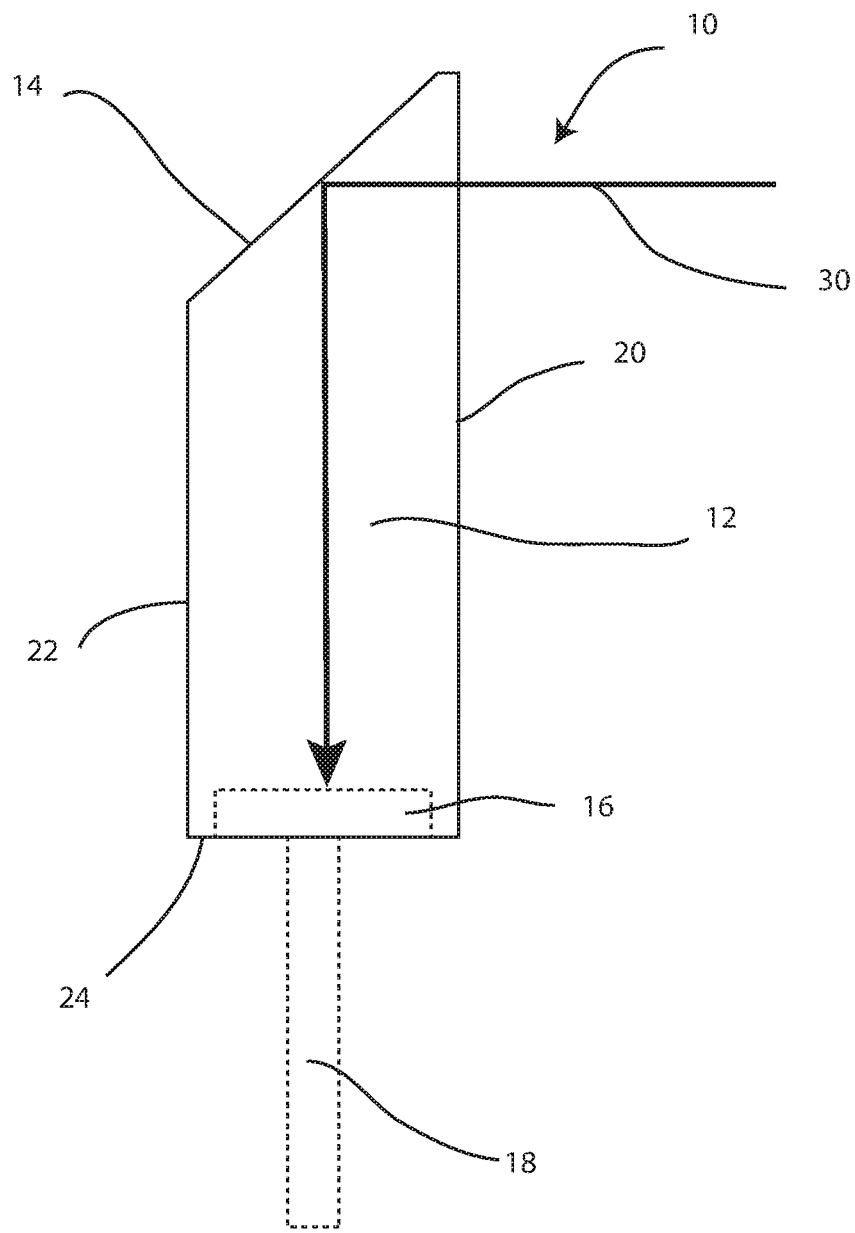
FIG. 3 is a side perspective view of an IR receiver made in accordance with an implementation of the invention, showing a first path for light to enter the IR receiver and travel to a sensor.

FIG. 3 is a side perspective view of an IR receiver made in accordance with an implementation of the invention, showing a first path for light to enter the IR receiver and travel to a sensor. An example light ray 30 is shown passing through wall 20, being reflected off of end surface 14, and then directed down to sensor 16.

Figure 4:
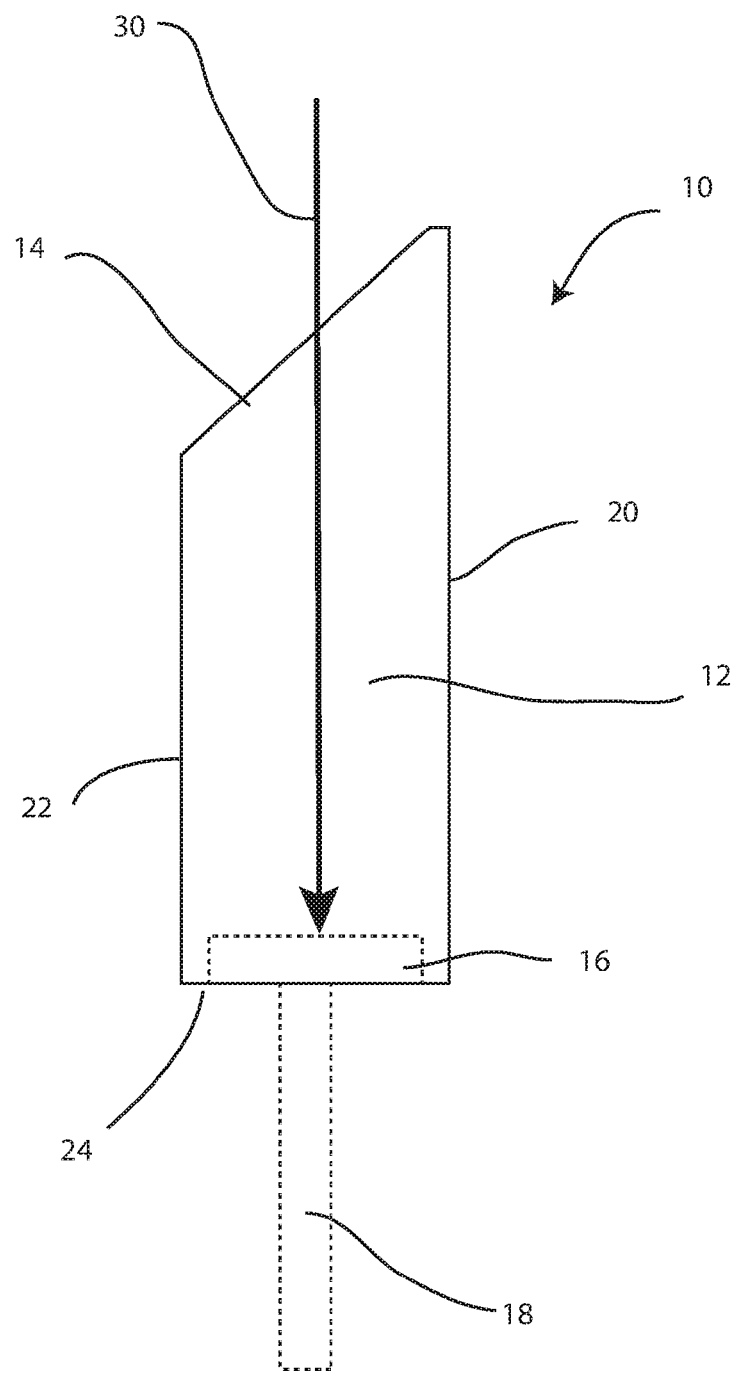
FIG. 4 is a side perspective view of an IR receiver made in accordance with an implementation of the invention, showing a second path for light to enter the IR receiver and travel to a sensor.

FIG. 4 is a side perspective view of an IR receiver made in accordance with an implementation of the invention, showing a second path for light to enter the IR receiver and travel to a sensor. In this implementation, light enters from the end surface 14 and then passes through the substantially transparent body 12 to the sensor 16. Note that typically the light ray 30 will refract somewhat (counterclockwise in the figure) but will still substantially strike the sensor 16.

Figure 5:
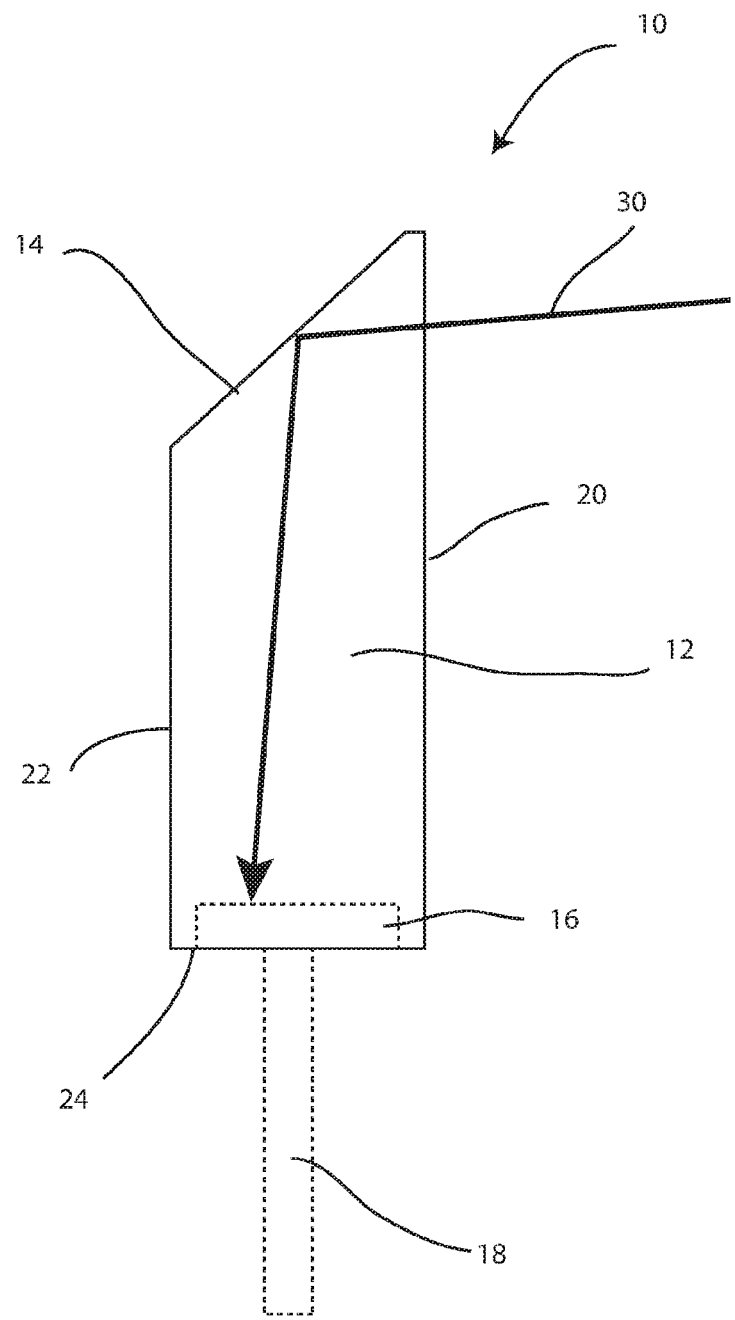
FIG. 5 is a side perspective view of an IR receiver made in accordance with an implementation of the invention, showing a third path for light to enter the IR receiver and travel to a sensor.

FIG. 5 is a side perspective view of an IR receiver made in accordance with an implementation of the invention, showing an alternate path for light to enter the IR receiver 10 and travel to sensor 16. In this case the light ray 30 enters the substantially transparent body 12 from an angle that is not quite 45 degrees relative to the surface 14. However, in this implementation the light ray 30 still hits the sensor 16.

Figure 6:
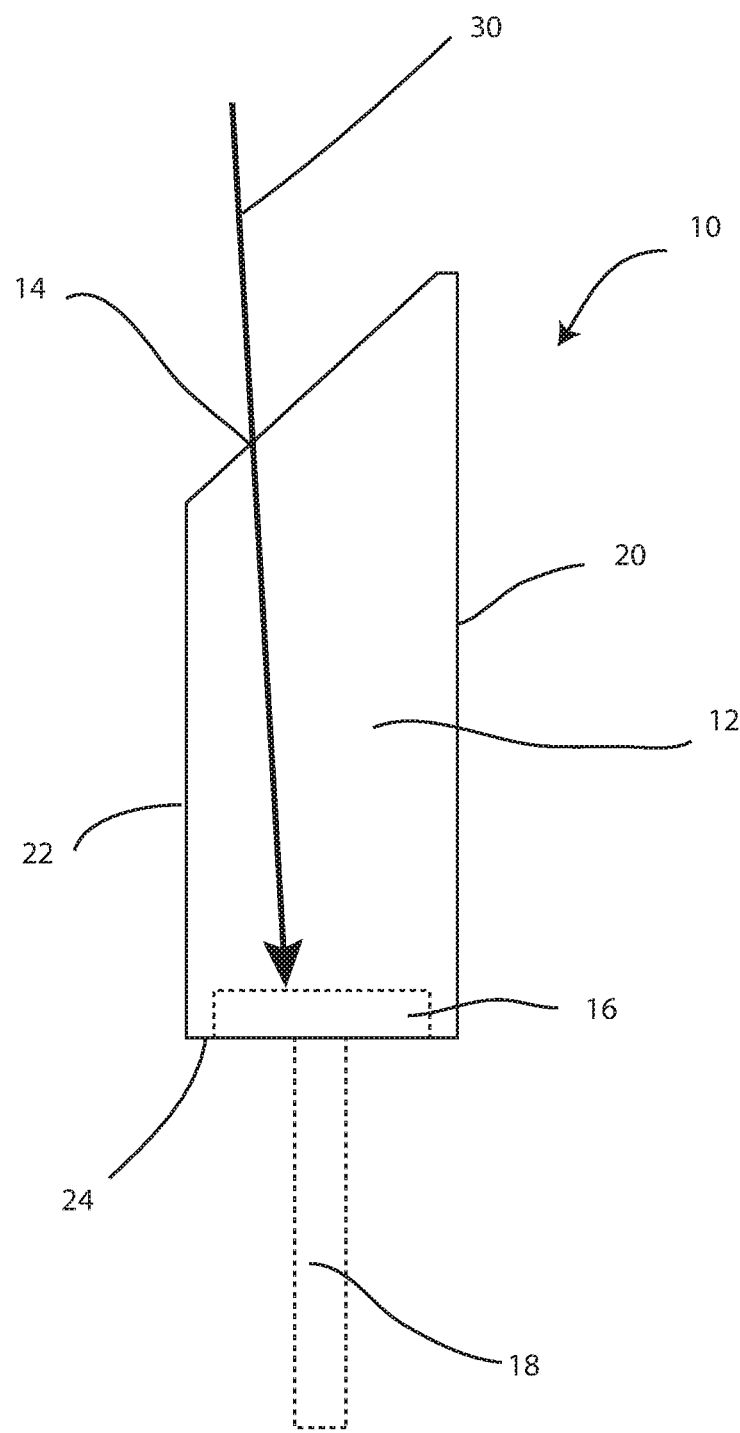
FIG. 6 is a side perspective view of an IR receiver made in accordance with an implementation of the invention, showing a fourth path for light to enter the IR receiver and travel to a sensor.

FIG. 6 is a side perspective view of an IR receiver made in accordance with an implementation of the invention, showing an alternate path for light to enter the IR receiver and travel to a sensor. In this implementation, light enters from the end surface 14 and then passes through the substantially transparent body 12 to the sensor 16. Note that typically the light ray 30 will refract somewhat (counterclockwise in the figure) but will still substantially strike the sensor 16

Figure 7:
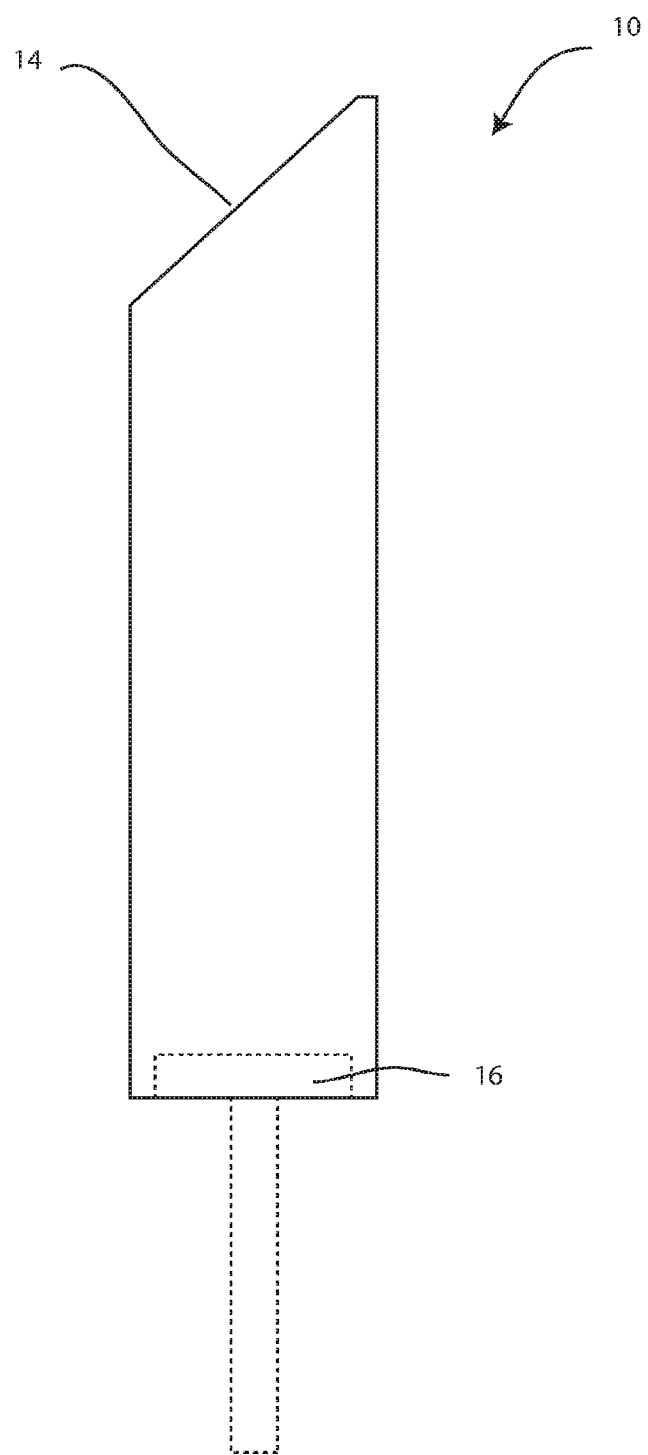
FIG. 7 is a side perspective view of an IR receiver made in accordance with an alternative implementation of the invention.
Figure 8:
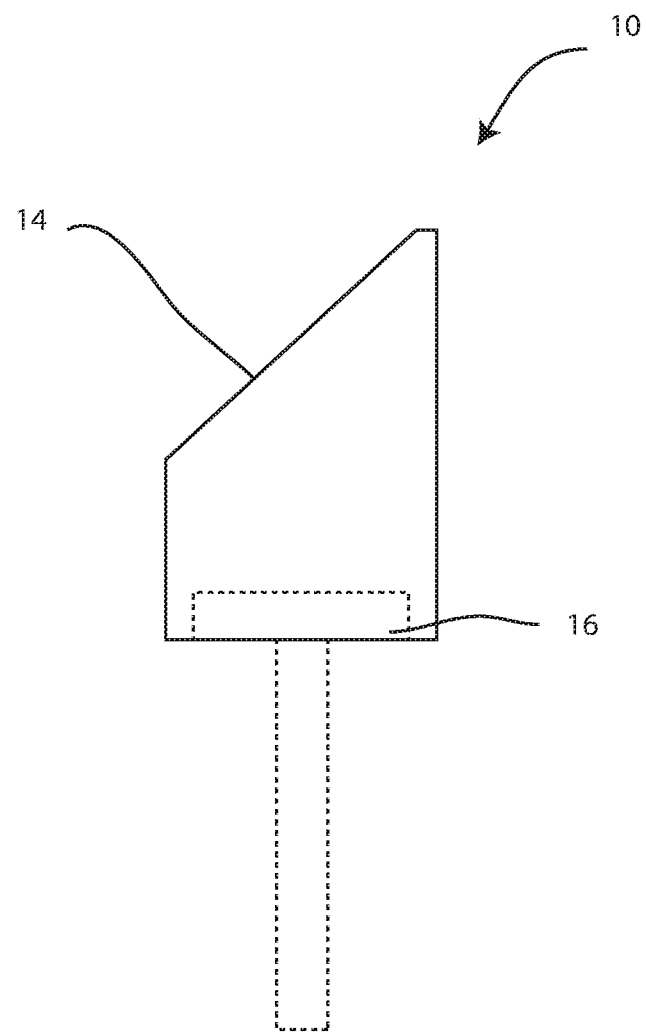
FIG. 8 is a side perspective view of an IR receiver made in accordance with an alternative implementation of the invention.

FIG. 7 is a side perspective view of an IR receiver made in accordance with an alternative implementation of the invention, in which the body 12 is relatively elongate compared to the implementation shown in FIG. 2. FIG. 8 is a side perspective view of an IR receiver made in accordance with an alternative implementation of the invention, in which the body 12 is relatively short compared to the implementation shown in FIG. 2.

Figure 9:
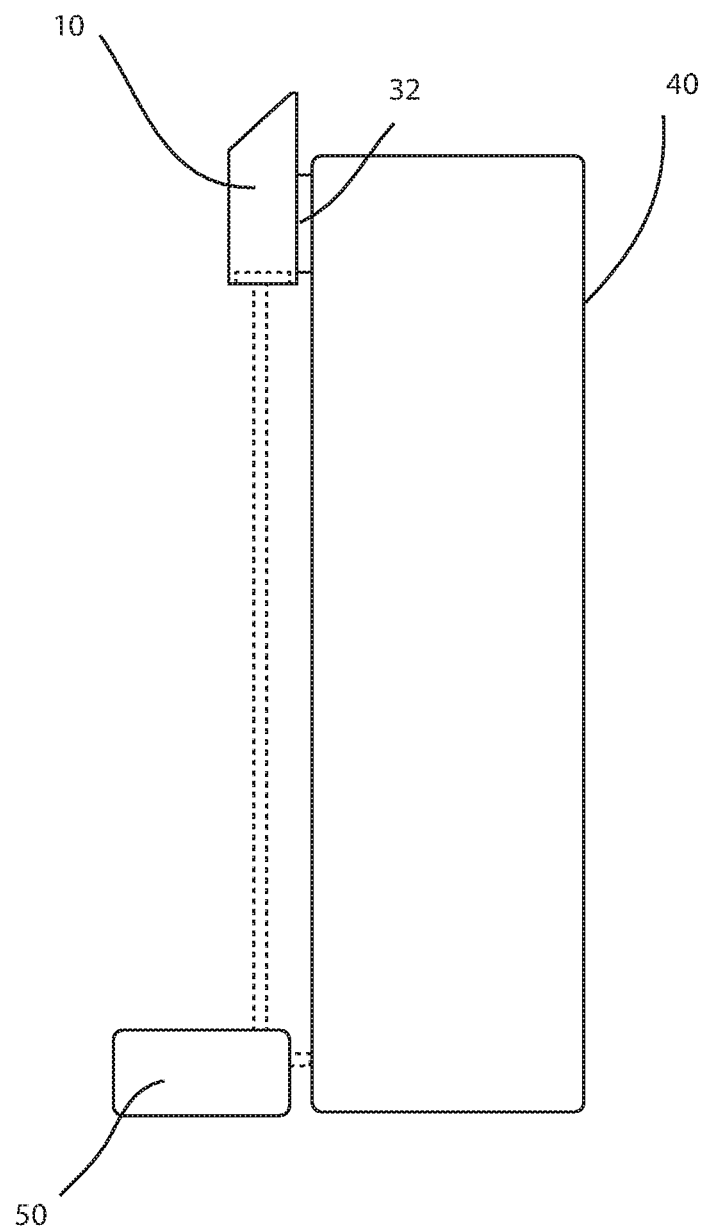
FIG. 9 is a side perspective view of an IR receiver made in accordance with an implantation of the invention, the IR receiver shown mounted behind and at the top of a stylized electronic device.

FIG. 9 is a side perspective view of an IR receiver 10 made in accordance with an implantation of the invention, the IR receiver 10 is shown mounted behind and at the top of a stylized electronic device 40 with adhesive strip 32. The IR receiver 10 is connected to an electronic apparatus 50 (such as a cable set back box or set top box, a satellite set back box or set top box, or another electronic apparatus that has an IR input).

Figure 10:
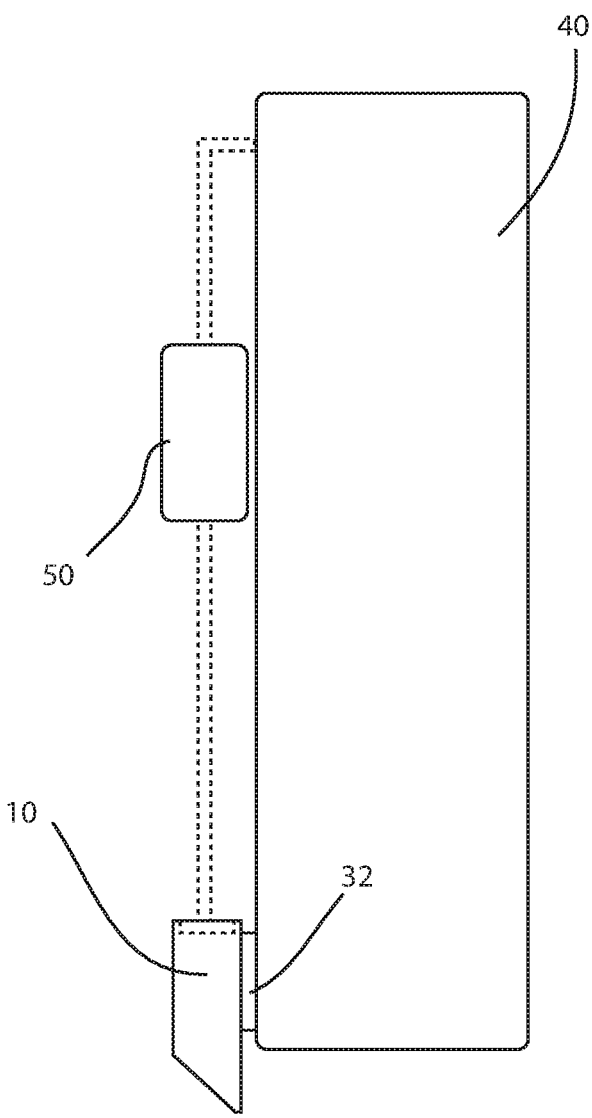
FIG. 10 is a side perspective view of an IR receiver made in accordance with an implantation of the invention, the IR receiver shown mounted behind and at the bottom of a stylized electronic device.

FIG. 10 is a side perspective view of an IR receiver made in accordance with an implantation of the invention, the IR receiver 10 is shown mounted behind and at the bottom of a stylized electronic device, also with adhesive 32. The IR receiver 10 is connected to an electronic apparatus 50 (such as a cable set back box or set top box, a satellite set back box or set top box, or another electronic apparatus that has an IR input).

Figure 11:
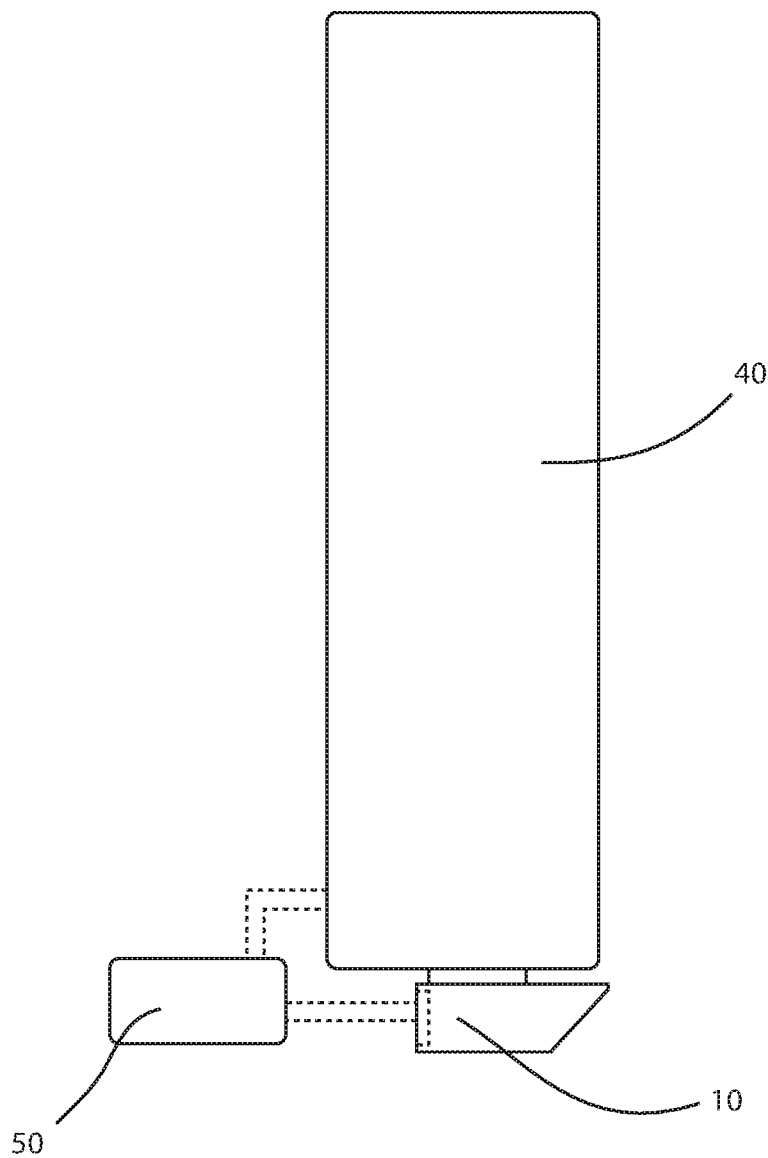
FIG. 11 is a side perspective view of an IR receiver made in accordance with an implantation of the invention, the IR receiver shown mounted below and near the front of a stylized electronic device.
Figure 12:
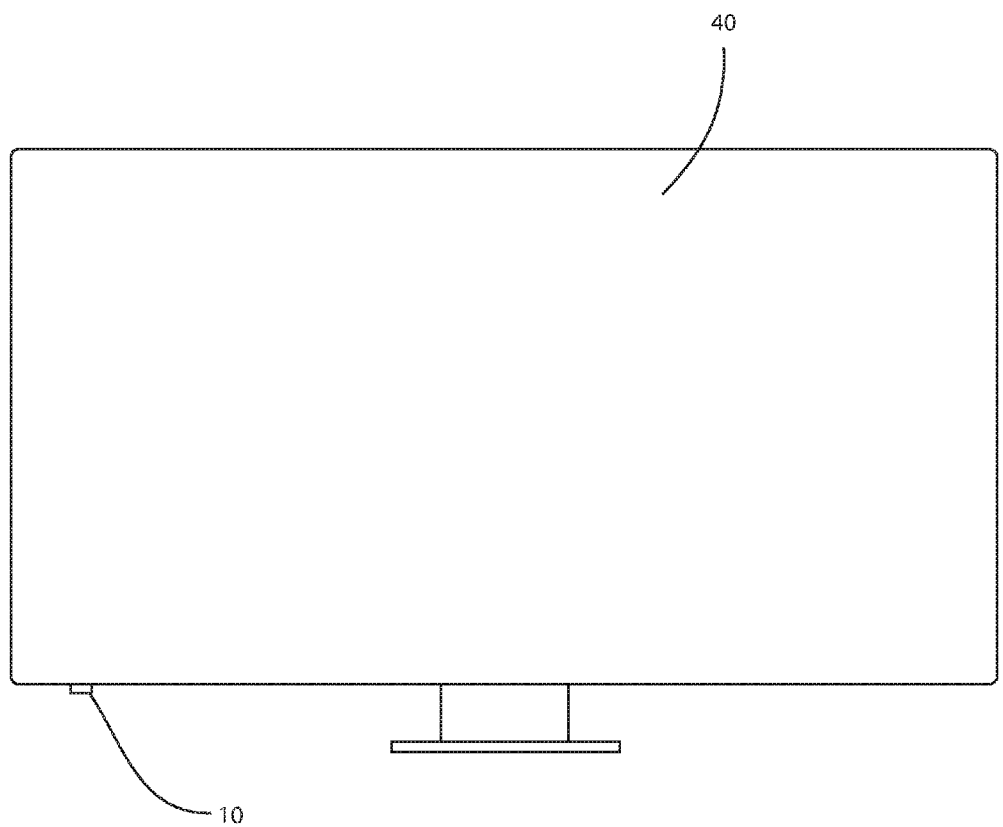
FIG. 12 is a front view of an IR receiver made in accordance with an implantation of the invention, the IR receiver shown mounted at the bottom of a stylized electronic device.

FIG. 11 is a side perspective view of an IR receiver made in accordance with an implantation of the invention, the IR receiver 10 is shown mounted below and near the front of a stylized electronic device 40. The IR receiver 10 is connected to an electronic apparatus 50 (such as a cable set back box or set top box, a satellite set back box or set top box, or another electronic apparatus that has an IR input). In all of the embodiments the portion of the IR receiver 10 visible from the front of the electronic device 40 is relatively small. This low profile aspect is shown in FIG. 12, which is a front view of an IR receiver made in accordance with an implantation of the invention, the IR receiver shown mounted at the bottom of a stylized electronic device.

While the present invention has been described with reference to several particular implementations, those skilled in the art will recognize that many changes may be made hereto without departing from the spirit and scope of the present invention.

I claim:

1. A receiver for an infrared light source, the receiver comprising:
   a substantially transparent body;
   a sensor for receiving infrared light; and
   a substantially planar first surface on the transparent body, the first surface configured to direct light from the infrared light source to the sensor;
   wherein the substantially planar first surface comprises the end of the substantially transparent body;
   wherein substantially planar first surface has a surface area at least 50 percent the cross sectional surface area of the substantially transparent body, the cross section take in a plane perpendicular to a line intersecting the substantially planar first surface of the transparent body and the sensor.

2. The receiver for an infrared light source of claim 1, wherein the substantially planar surface of the transparent body comprises substantially all of an end of the transparent body.

3. The receiver for an infrared light source of claim 1, wherein the substantially planar surface of the transparent body is located opposite the sensor.

4. The receiver for an infrared light source of claim 1, wherein the substantially planar surface of the transparent body has an angle of from 30 to 60 degrees relative to an adjacent wall of the substantially transparent body.

5. The receiver for an infrared light source of claim 1, wherein the substantially planar surface of the transparent body has an angle 45 degrees relative to an adjacent wall of the substantially transparent body.

6. The receiver for an infrared light source of claim 1, wherein the transparent body is comprised of a polymeric material.

7. The receiver for an infrared light source of claim 1, wherein substantially planar first surface has a surface area at least 100 percent the cross sectional surface area of the substantially transparent body, the cross section take in a plane perpendicular to a line intersecting the substantially planar first surface of the transparent body and the sensor.

8. The receiver for an infrared light source of claim 1, wherein substantially planar first surface has a surface area at least 150 percent the cross sectional surface area of the substantially transparent body, the cross section take in a plane perpendicular to a line intersecting the substantially planar first surface of the transparent body and the sensor.

9. The receiver for an infrared light source of claim 1, wherein the substantially planar first surface provides an internally reflective surface.

10. A receiver for an infrared light source, the receiver comprising:
    a substantially transparent body;
    a sensor for receiving infrared light; and
    a surface on the transparent body, the first surface configured to direct light from the infrared light source to the sensor;
    wherein the substantially planar first surface provides an internally reflective surface;
    wherein the surface of the transparent body configured to direct light from the infrared light source to the sensor has a surface area at least 50 percent the cross sectional surface area of the substantially transparent body, the cross section take in a plane perpendicular to a line intersecting the substantially planar first surface of the transparent body and the sensor.

11. The receiver for an infrared light source of claim 10, wherein the surface of the transparent body configured to direct light from the infrared light source to the sensor comprises substantially all of an end of the transparent body.

12. The receiver for an infrared light source of claim 10, wherein the surface of the transparent body configured to direct light from the infrared light source to the sensor of the transparent body is located opposite the sensor.

13. The receiver for an infrared light source of claim 10, wherein the surface of the transparent body configured to direct light from the infrared light source to the sensor has an angle of from 30 to 60 degrees relative to an adjacent wall of the substantially transparent body.

14. The receiver for an infrared light source of claim 10, wherein the surface of the transparent body configured to direct light from the infrared light source to the sensor has an angle 45 degrees relative to an adjacent wall of the substantially transparent body.

15. The receiver for an infrared light source of claim 10, wherein the transparent body is comprised of a polymeric material.

16. The receiver for an infrared light source of claim 10, wherein the surface of the transparent body configured to direct light from the infrared light source to the sensor has a surface area at least 100 percent the cross sectional surface area of the substantially transparent body, the cross section take in a plane perpendicular to a line intersecting the substantially planar first surface of the transparent body and the sensor.

17. The receiver for an infrared light source of claim 10 wherein the surface of the transparent body configured to direct light from the infrared light source to the sensor has a surface area at least 150 percent the cross sectional surface area of the substantially transparent body, the cross section take in a plane perpendicular to a line intersecting the substantially planar first surface of the transparent body and the sensor.

18. The receiver for an infrared light source of claim 10, wherein the substantially planar first surface is substantially planar.

* * * * *